US009462412B1

(12) United States Patent
Ramachandran et al.

(10) Patent No.: US 9,462,412 B1
(45) Date of Patent: Oct. 4, 2016

(54) PROVIDING CONTENT BASED ON PREVIOUSLY DETERMINED DEVICE LOCATIONS

(71) Applicant: Google Inc., Mountain View, CA (US)

(72) Inventors: Vinod Kumar Ramachandran, Sunnyvale, CA (US); Ping Wu, Saratoga, CA (US)

(73) Assignee: Google Inc., Mountain View, CA (US)

( * ) Notice: Subject to any disclaimer, the term of this patent is extended or adjusted under 35 U.S.C. 154(b) by 446 days.

(21) Appl. No.: 13/648,947

(22) Filed: Oct. 10, 2012

(51) Int. Cl.
*G06F 15/16* (2006.01)
*H04W 4/02* (2009.01)

(52) U.S. Cl.
CPC ............... *H04W 4/02* (2013.01); *H04W 4/023* (2013.01); *H04W 4/025* (2013.01)

(58) Field of Classification Search
CPC ..... H04W 4/02; H04W 4/206; H04W 64/00; H04W 4/023; H04W 4/025
USPC ........................................ 709/217, 224, 229
See application file for complete search history.

(56) References Cited

U.S. PATENT DOCUMENTS

| | | | | |
|---|---|---|---|---|
| 8,138,907 | B2* | 3/2012 | Barbeau et al. | 340/457 |
| 8,285,308 | B1* | 10/2012 | Wright et al. | 455/456.3 |
| 8,340,685 | B2* | 12/2012 | Cochran et al. | 455/456.1 |
| 8,788,328 | B1* | 7/2014 | George et al. | 705/14.1 |
| 2003/0006913 | A1* | 1/2003 | Joyce et al. | 340/994 |
| 2003/0008661 | A1* | 1/2003 | Joyce et al. | 455/456 |
| 2009/0239553 | A1* | 9/2009 | Wright et al. | 455/456.3 |
| 2010/0323716 | A1* | 12/2010 | Jaffri | G06Q 30/02 455/456.1 |
| 2011/0035284 | A1* | 2/2011 | Moshfeghi | G06Q 30/02 705/14.58 |
| 2011/0191185 | A1* | 8/2011 | Schroeder et al. | 705/14.58 |
| 2012/0059721 | A1* | 3/2012 | Blegen | G06Q 30/02 705/14.58 |
| 2012/0130796 | A1* | 5/2012 | Busch | G06Q 30/02 705/14.36 |
| 2012/0230486 | A1* | 9/2012 | Guerrero | 379/211.01 |

OTHER PUBLICATIONS

Podnar, I. ; Hauswirth, M. ; Jazayeri, M. , Mobile push: delivery content to mobile users, 2002, IEEE, Distributed Computing Systems Workshops, 2002. Proceedings. 22nd International Conference, pp. 563-568.*
Vincent Lenders, Emmanouil Koukoumidis, Pei Zhang, Margaret Martonosi, Location-based trust for mobile User-genarated content: applications, challenges and implementations, 2008, ACM New York, '08 Proceedings of the 9th workshop on Mobile computing systems and applications, pp. 60-64.*
Miltiadis Allamanis, Salvatore Scellato and Cecilia Mascolo, Evolution of a location-based online social network: analysis and models, Oct. 29-30, 2012. ACM, IMC '12 Proceedings of the 2012 ACM conference on Internet measurement conference, pp. 145-158.*

* cited by examiner

*Primary Examiner* — June Sison
*Assistant Examiner* — Dixon Dabipi
(74) *Attorney, Agent, or Firm* — Foley and Lardner LLP; John D. Lanza; James De Vellis (57) ABSTRACT

This specification describes technologies relating to content presentation. In general, one aspect of the subject matter described in this specification can be embodied in methods that include the actions of receiving, at a first time, a device identifier in association with a first network identifier that corresponds to a first network to which the device is connected, processing the first network identifier to determine a first location, associating the device identifier with the first location and the first time, receiving a content request from the device, determining that the device has been connected to the first network within a defined chronological proximity of receiving the content request, selecting one or more content items based on at least the first location, and providing the one or more content items to the device. Other embodiments of the various aspects include corresponding systems, apparatus, and computer program products.

22 Claims, 8 Drawing Sheets

FIG. 6

PROVIDING CONTENT BASED ON PREVIOUSLY DETERMINED DEVICE LOCATIONS

BACKGROUND

The present disclosure relates to content presentation.

Content providers provide content in different forms in order to attract consumers. Such content is designed to be used in whole or part by a user, for example, a particular consumer. Additionally, such content can be provided in electronic form. For example, such content can be provided on a web page, together with search results, or within a mobile application.

SUMMARY

This specification describes technologies relating to content presentation.

In general, one aspect of the subject matter described in this specification can be embodied in methods for providing third party content at a device. The method includes the actions of receiving, at a first time, a device identifier in association with a first network identifier, the first network identifier corresponding to a first network to which the device is connected, processing the first network identifier to determine a first location, associating the device identifier with the first location and the first time, receiving a content request from the device, the device being connected to a network that is not the first network, determining that the device has been connected to the first network within a defined chronological proximity of receiving the content request, based on a determination that the device has been connected to the first network within the defined chronological proximity of receiving the content request, selecting one or more content items based on at least the first location, and providing the one or more content items to the device.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

By way of overview and introduction, it can be advantageous for content providers, such as advertisers, to deliver content to user devices, such as smartphones, based on the location of such devices. For example, advertisers who provide products or services that pertain to a particular location may wish to provide advertisements only to those devices that can be determined to be present in such locations. Accordingly, such advertisers may wish to only provide bids in advertising auctions with respect to which advertisements can be provided to devices located in the desired location(s).

With respect to determining the location of a particular device, it can be appreciated that while such a location can be determined to a certain degree of accuracy (e.g., zip code level) when a device is connected to a network such as a wifi network (based on the IP address of the wifi network, such as in a manner known to those of ordinary skill in the art), in other scenarios, such as when the device is connected to a cellular network, such a degree of location accuracy cannot be achieved based on the IP address of the cellular network. Accordingly, described herein in various implementations are various methods that enable location determination of various devices, and the providing of location-specific content to such devices, even in scenarios where such devices are connected to networks with respect to which a current location of the device cannot be accurately determined.

While reference will be made below to advertising systems and processes, other forms of content including other forms of sponsored content can be managed and presented in accordance with the description below.

Figure 1:
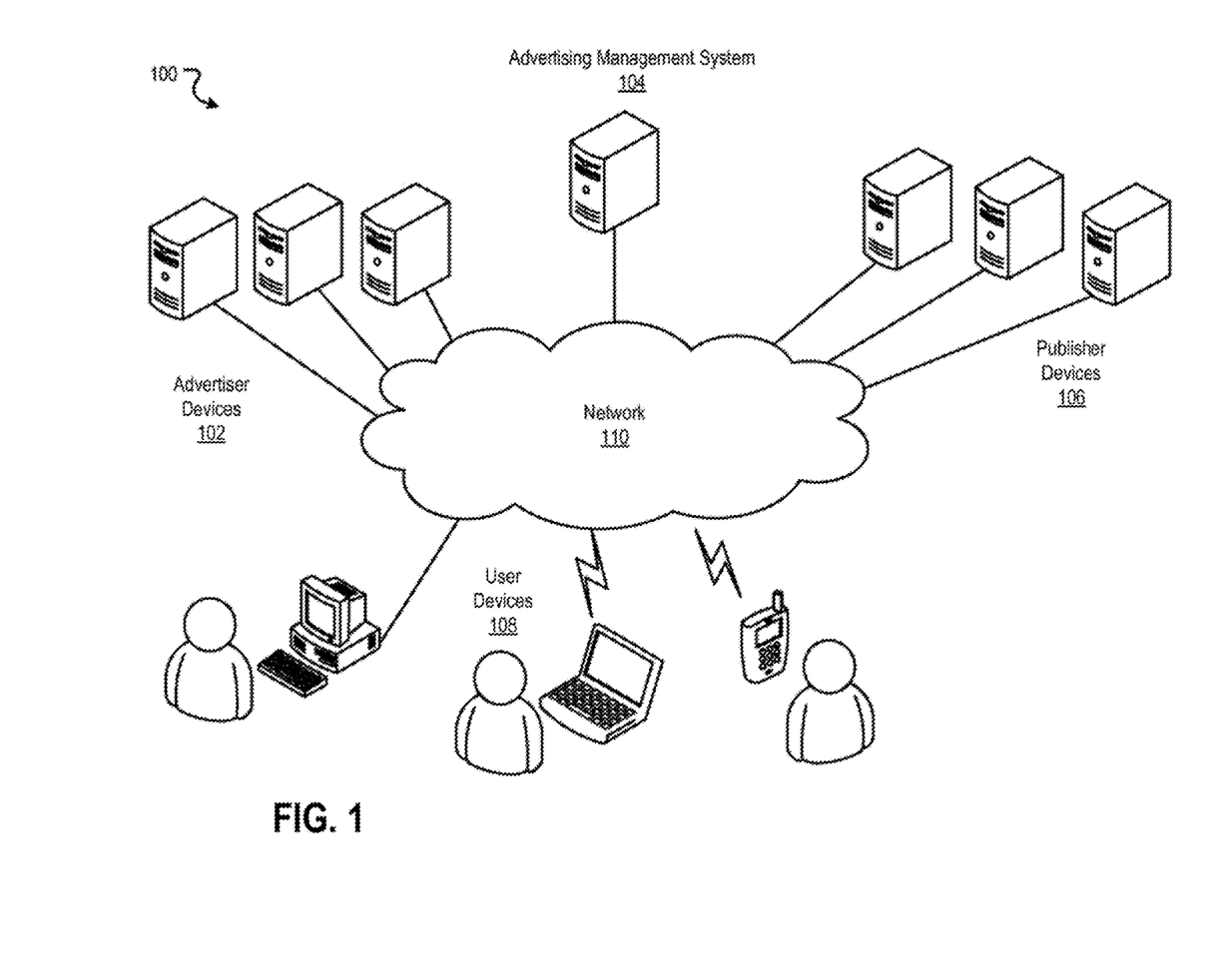
FIG. 1 is a diagram of an example content presentation system.

FIG. 1 is a block diagram showing an example content presentation system 100. In some implementations, one or more third party content providers such as advertisers, using advertiser devices 102, can directly, or indirectly, enter, maintain, and log third party content information such as ad information in a content management system such as advertising management system 104. Though reference is made to advertising, other forms of content, including other forms of sponsored content, can be delivered by the system 100. The ads can be in the form of graphical ads, such as banner ads, text-only ads, image ads, audio ads, video ads, media ads, interactive ads, ads combining one or more of any of such components, etc. The ads can also include embedded information, such as links, meta-information, and/or machine executable instructions.

One or more first party content providers such as publishers, using publisher devices 106, can submit requests for third party content items such as ads to the system 104. The system 104 responds by sending third party content items to the requesting publisher device 106 for placement on, or association with, one or more of the publisher's content items (e.g., web properties such as web pages). It should also be understood that in certain implementations, third party content items such as ads can be provided in a substantially similar manner in television and radio content slots (such as advertising slots), and/or print media space.

Other entities, such as users, using user devices 108, and third party content providers such as the advertisers, using advertiser devices 102, can provide usage information to the system 104, such as, for example, whether or not a conversion (e.g., a purchase or other interaction including, for example, a request for driving directions to a location associated with a third party content item such as an ad, navigating to the location associated with a third party content item such as the ad, or walking to the location associated with a third party content item such as the ad) or a click-through related to a third party content item such as an ad (e.g., a user has selected a third party content item such as an ad) has occurred. This usage information can include measured or observed user behavior related to third party content items such as ads that have been served. In some cases, a user may enable and/or disable the recording or observation of such usage information. In some cases, identifiers associated with each user may be anonymized so that the identity of each user is not provided to a third party content provider such as the advertiser. The system 104 can perform financial transactions, for example, crediting first party content providers such as the publishers 106 and charging third party content providers such as the advertisers 102 based on the usage information.

A network 110, such as a local area network (LAN), wide area network (WAN), the Internet, one or more telephony networks or a combination thereof, connects advertiser devices 102, the system 104, publisher devices 106, and user devices 108.

One example publisher device 106 is a general content server that receives requests for first party content (e.g., articles, discussion threads, music, video, graphics, search results, web page listings, information feeds, etc.), and retrieves the requested first party content in response to the request. The content server can submit a request for third party content such as ads to a content server such as an advertisement server in the system 104. The third party content item request can include a number of third party content items such as ads desired. The third party content item request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser can combine the requested first party content with one or more of the third party content items such as ads provided by the system 104. The combined first party content and third party content items such as ads can be sent/rendered to the user devices 108 that requested the content for presentation in a viewer (e.g., a browser or other content display system). The content server can transmit information about the third party content items such as ads back to the content server, including information describing how, when, and/or where the third party content items such as ads are to be rendered (e.g., in HTML or JavaScript™).

Another example publisher device 106 is a server that provides a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and can be grouped into a predetermined number of (e.g., ten) search results.

The search service can submit a request for third party content items such as ads to the system 104. The request can include a number of third party content items desired. This number can depend on the search results, the amount of screen or page space occupied by the search results, the size and shape of the third party content items, and/or a variety of other factors. In some implementations, the number of desired third party content items will be from one to ten, or from three to five. The request for third party content items can also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

In some implementations, the content management system 104 includes an auction process to select third party content items such as ads from the third party content providers such as advertisers. For example, third party content providers such as the advertisers can be permitted to select, or bid, an amount they are willing to pay for each presentation of or interaction with (e.g., click of) a third party content item, e.g., a cost-per-click amount a third party content provider pays when, for example, a user clicks on a third party content item. The cost-per-click can include a maximum cost-per-click, e.g., the maximum amount the third party content provider is willing to pay for each click of an third party content item based on a keyword, e.g., a word or words in a query. Other bid types, however, can also be used. Based on these bids, third party content items can be selected and ranked for presentation.

The search service can combine the search results with one or more of the third party content items provided by the system 104. This combined information can then be forwarded to the user devices 108 that requested the content. The search results can be maintained as distinct from the third party content items, so as not to confuse the user between paid third party content items and presumably neutral search results.

In some implementations, one or more publisher devices 106 can submit requests for third party content items such as ads to a content management system such as advertising management system 104. The system 104 responds by sending third party content items to the publisher device 106 for placement on one or more of the publisher's web properties (e.g., websites and other network-distributed content) that are relevant to the web property. For example, if a publisher device 106 publishes a sports-related web site, the advertising management system can provide sports-related ads to the publisher device 106. In some implementations, the requests can instead be executed by devices associated with the user 108, e.g., by the execution of a particular script when the publisher's web page is loading on a client device.

In some alternative implementations, an ad push model is used to provide third party content items such as ads from third party content providers such as advertisers. In an ad push model, ads can be pushed to idle screens (e.g., of a mobile devices or particular applications) based on particular criteria (e.g., the user's location).

In another example the referenced publisher can be a mobile application developer. A mobile application is an application specifically designed for operation on a mobile device (e.g., a smart phone). The mobile application can also include ads positioned within the content of the mobile application. Similar to publishers, the ads can be received from the system 104 for placement in the mobile application when accessed by a user device (e.g., when a particular page of a mobile application is loaded on the mobile device).

For situations in which the systems discussed here collect personal information about users, the users may be provided with an opportunity to control the manner such information is collected with respect to programs or features that may collect personal information (e.g., information about a user's preferences or a user's current location). Users may also be informed of the accompanying limitations on the functionality of a service that may result from limiting access to such personal information. In addition, certain data may be anonymized in one or more ways before it is stored or used, so that personally identifiable information is removed. For example, a device identifier associated with a user's identity may be anonymized so that no personally identifiable information can be determined for the user, or a user's geographic location may be generalized where location information is obtained (such as to a city, zip code, or state level), so that a particular location of a user cannot be determined.

Figure 2:
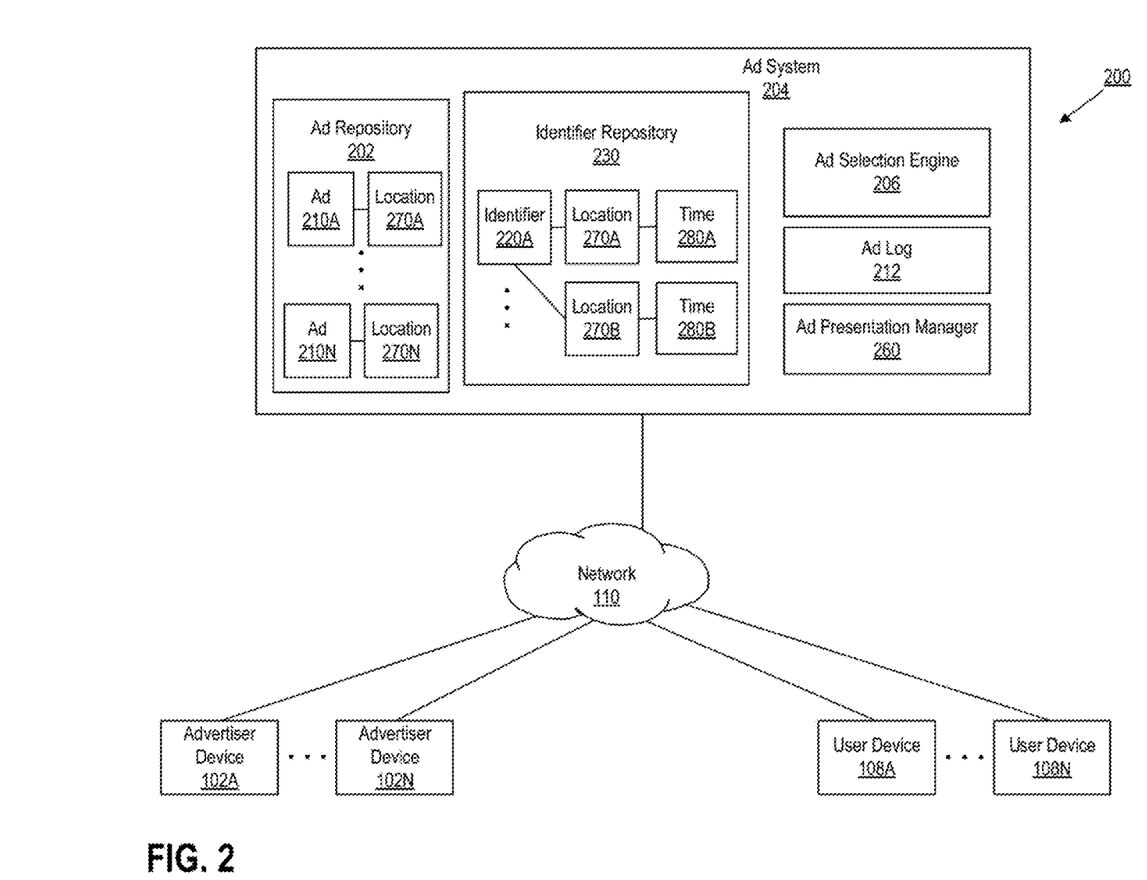
FIG. 2 is a block diagram of an example system for providing third party content.

FIG. 2 is a block diagram of an example system 200 for providing third party content. In the system 200, a third party content provider such as advertiser, using advertiser devices 102A-102N (referred to collectively as advertiser devices 102) can submit one or more third party content items such as ads 210A-210N (also known as "creatives") (referred to collectively as ads 210) to an ad system 204, and such ads 210 are stored in a third party content repository such as an ad repository 202. Each ad (e.g., ad 210A) includes one or more words, phrases, web links, and/or any other such element and/or component (e.g., images, video, audio, etc.) that are provided to one or more user devices 108 (e.g., banner ads, text-only ads, image ads, audio ads, video ads, etc.). In certain implementations, one or more keywords (not shown) are associated with one or more creatives in order to enable the identification and selection of pertinent ads for display to a user based on one or more search queries received from the user. It should also be noted that although ads 210 are described herein as referring to individual ads, in certain implementations ads 210 can refer to groups of ads, such as ad groups, campaigns, and/or categories. Moreover, each of the third party content items, such as ads 210, can be associated with a particular location, such as location 270A and location 270N (referred to collectively as locations 270). Locations 270 can correspond to one or more geographic areas or regions (e.g., zip codes, cities, states, countries, etc.) to which an associated ad 210 is directed. That is, it can be appreciated that it can be advantageous for an advertiser to focus a particular advertisement (such as an advertisement for a location-specific product or service) towards users located in a particular geographic location. Accordingly, a particular ad 210 can be configured to be presented only to those users that can be determined to be present in and/or associated with the location 270 associated with the ad.

Ad system 204 can also include an ad presentation manager 260. The ad presentation manager 260 can identify ads in the ad repository 202 to present at a user device 108, for example based on various criteria such as keywords in a search query, web page content, context, location, ad financials (e.g., cost per impression). For example, ad presentation manager 260 can identify one or more ads 210 associated with one or more keywords that are similar and/or identical to the search query provided by the user, and such creatives can be provided to the user in any number of ad formats. It should be understood that in some implementations, the ad system 204 can interact with a search system, for example presenting ads alongside search results. In some implementations, the ad system 204 can interact with content publishers, for example, providing ads to publishers or users for presentation along with web content, e-mail, or other content.

Ad system 204 can also include one or more ad logs 212. In certain implementations, ad log 212 can maintain ad display histories, which maintains a record of the various instances of the display of respective ads to respective users. Moreover, in certain implementations ad log 212 can maintain a record of one or more ad performance metrics 220 that reflect the performance or success of a particular third party content item such as an ad. For example, for a given ad, ad log 212 can maintain a record of the 'click through rate' (CTR), reflecting the percentage of users presented with an ad that click on or otherwise select the presented content, though it should be understood that any number of other performance metrics can be similarly tracked (e.g., conversion rate), as is known to those of ordinary skill in the art.

Ad system 204 can also include an identifier repository 230 that stores one or more identifiers, such as identifier 220A (referred to collectively as identifiers 220). Such identifiers 220 can reflect one or more user IDs and/or device IDs, such as those corresponding to a particular user or device. Moreover, such identifiers can be associated with and/or otherwise linked to one (or more) locations 270, such as zip codes, geographical coordinates, cities, states, etc., as described herein. Additionally, each respective location can be associated with a particular time 280, such as a timeframe. Accordingly, it can be appreciated that a particular identifier 220 can be associated with several locations 270, each of which corresponds to a different time 280 during which the identifier is associated with the corresponding location, as described in greater detail herein. It should be noted that in situations where personal or identifying information is collected, users may be provided with the ability to control whether such information is collected, the extent to which such information is collected, and/or the extent to which a user can be identified based on it. For example, a user can select an option whereby any personal or identifying information is immediately aggregated with that of other users such that such information cannot subsequently be associated with or otherwise identify the individual user.

Additionally, ad system 204 can include ad selection engine 206. The ad selection engine 206 can select one or more third party content items, such as ads 210, such as based on a determination that a user device has been connected to the a particular network within a defined chronological proximity of receiving a content request, as described in detail herein. It should also be understood that in some implementations ad configuration engine 206 can include one or more processors configured by code to implement the functionality of the ad configuration engine that is being described.

Figure 3:
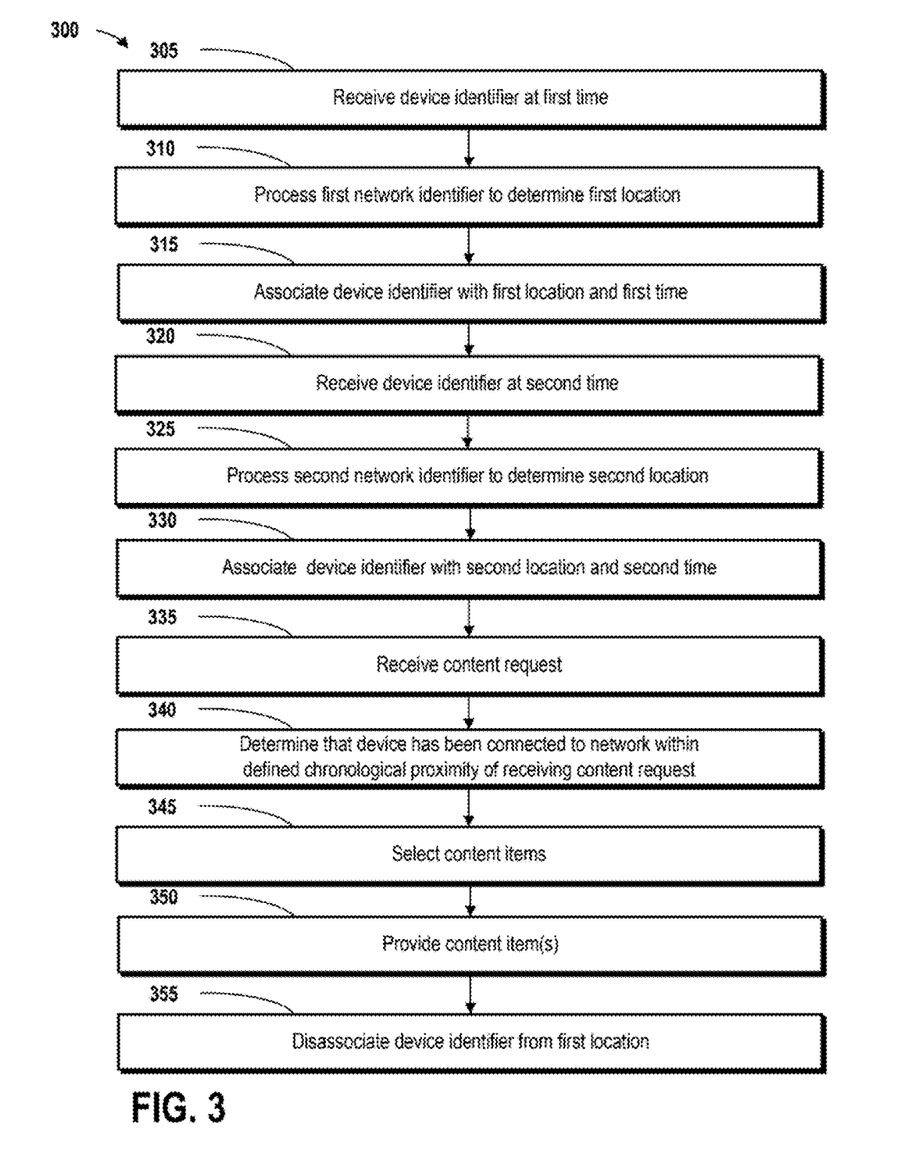
FIG. 3 is a flow chart of an example process for providing third party content.

FIG. 3 is a flowchart of an example method 300 for providing third party content. In some implementations, the method 300 can be performed by a processor executing instructions in a non-transitory computer-readable storage medium. For example, the method 300 can be performed by the ad system 204 of FIG. 2.

A device identifier is received at a first time (305). In certain implementations, such a device identifier is received in association with a first network identifier. Such a first network identifier corresponds to a first network to which the device is connected. It should be understood that, in certain implementations, the referenced device identifier can include a hashed device identifier. It should also be understood that, in certain implementations, the referenced first time includes a first timeframe (i.e., a timeframe during which the device was connected to the first network). For example, the first network can include a wireless (802.11) ("wifi") network, as is known to those of ordinary skill in the art.

Figure 4A:
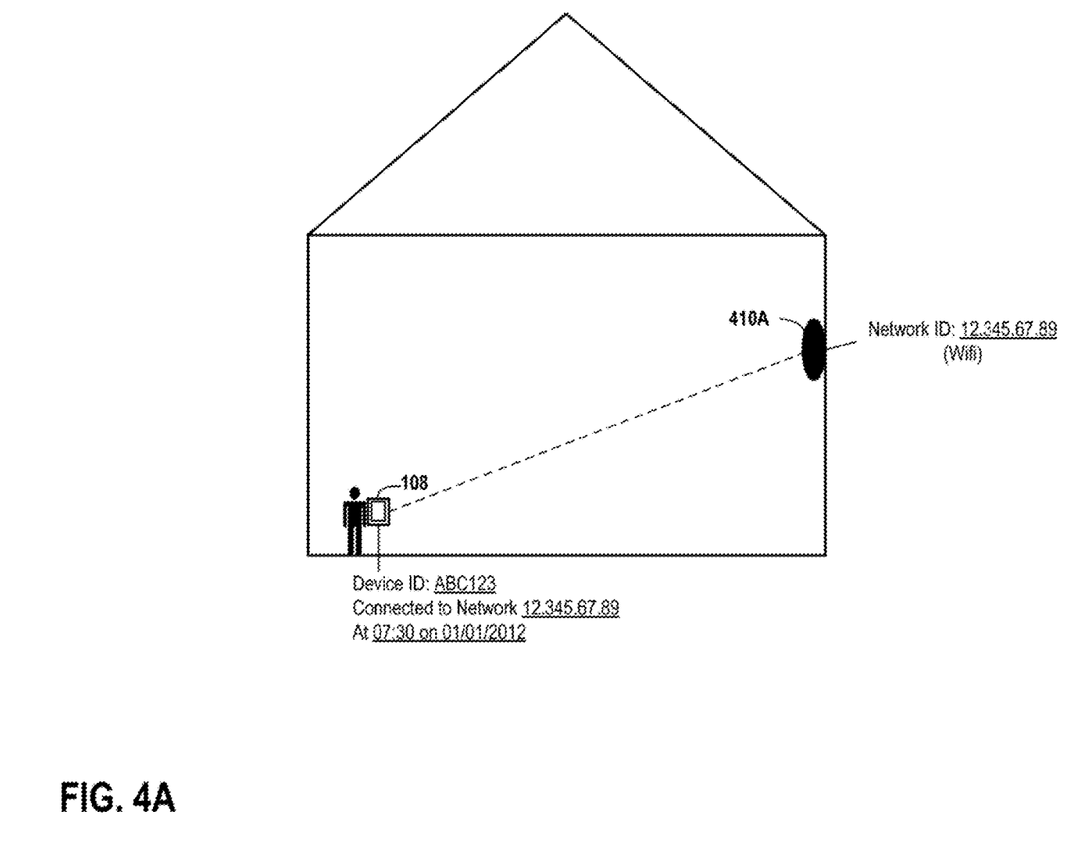
FIG. 4A depicts an exemplary scenario whereby a user device is connected to a network such as a wifi access point.

By way of illustration, FIG. 4A depicts an exemplary scenario whereby a user device 108, such as a smartphone, is connected to a first network 410A, such as a wifi access point. It can be appreciated with reference to FIG. 4A that user device 108 can have a device ID ('ABC123,' as shown in FIG. 4A) which can correspond, for example, to a user ID and/or a device ID (such as a MAC address). It can be further appreciated that a network ID, such as an IP address ('12.345.67.89,' as shown in FIG. 4A), of the first network 410A can be associated with the device ID of the connected user device 108. Additionally, a time, such as a specific time ('07:30 on 01/01/2012,' as shown in FIG. 4A) or a timeframe (e.g., a span of time, such as 18:00-08:00 or 6:00 pm-8:00 am) can be associated with the device identifier and the network identifier, reflecting the time/timeframe during which the device was connected to the network.

The first network identifier is processed (310). In doing so, a first location can be determined. By way of illustration, such a first location can include/reflect a zip code, such as a zip code associated with the first network. For example and with reference to FIG. 4A, the network ID of network 410A ('12.345.67.89') can be processed to determine a location, such as a zip code (e.g., zip code '10001') associated with network 410A, such as in a manner known to those of ordinary skill in the art. In other implementations, such a user location can be determined using other methods/techniques, such as based on the GPS coordinates of the device.

The device identifier is associated with the first location and the first time (315). For example and with reference to FIG. 4A, the device identifier of device 108 ('ABC123') can be associated with a first location (zip code '10001,' as determined at 310) and a time ('07:30 on 01/01/2012' and/or 18:00-08:00), such as in the manner shown in FIG. 2. It can be appreciated that, in doing so, the device identifier can be associated with a particular location (corresponding to the location of the network 410A to which the device was connected) and a particular time (corresponding to the time/timeframe during which the device was connected network 410A, and thus can be determined to be located at the first location, e.g., zip code 10001).

A device identifier is received at a second time (320). In certain implementations, such a device identifier is received in association with a second network identifier. Such a second network identifier corresponds to a second network to which the device is connected. For example, the second network can include a wireless (802.11) ("wifi") network, as is known to those of ordinary skill in the art.

Figure 4B:
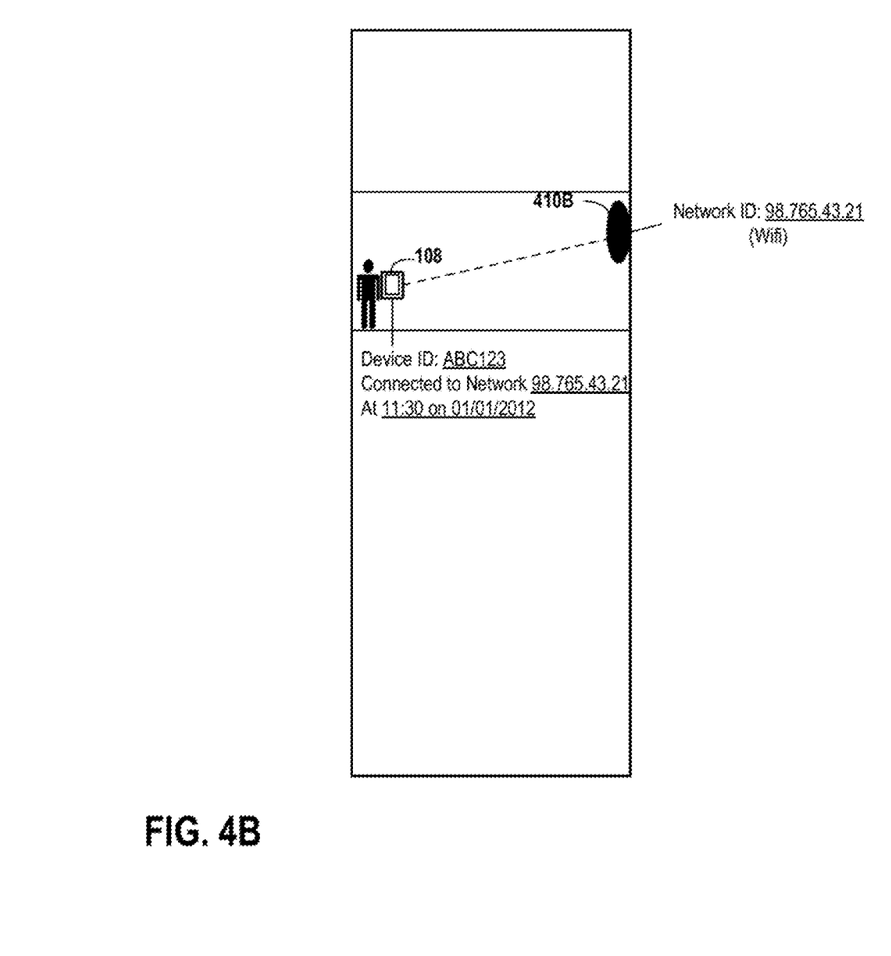
FIG. 4B depicts an exemplary scenario whereby a user device is connected to a network such as a wifi access point.

By way of illustration, FIG. 4B depicts an exemplary scenario whereby user device 108 (such as the user device depicted in FIG. 4A) is connected to a second network 410B, such as a wifi access point. It can be appreciated that a network ID, such as an IP address ('98.765.43.21,' as shown in FIG. 4B), of the second network 410B can be associated with the device ID of the connected user device 108. Additionally, a time, such as a specific time ('11:30 on 01/01/2012,' as shown in FIG. 4B) or a timeframe (e.g., a span of time, such as 09:00-17:00 or 9:00 am-5:00 pm) can be associated with the device identifier and the network identifier, reflecting the time/timeframe during which the device was connected to the network, such as a time/timeframe other than that corresponding to network 410A. In certain implementations, the referenced timeframe can be determined and/or generated based on one or more times that a device is connected to a particular network. For example, in a scenario where a particular device is determined to be connected to a particular network at multiple time intervals (e.g., at 9:00 am, 10:00 am, 3:00 pm and 5:00 pm), and the device is not determined to be connected to other networks in between such intervals, a timeframe can be generated spanning such times at which the device was determined to be connected to the network (i.e., 9:00 am-5:00 pm), as it can be reasonably concluded that the device was only in proximity to the network throughout the timeframe.

The second network identifier is processed (325). In doing so, a second location can be determined. By way of illustration, such a second location can include/reflect a zip code, such as a zip code associated with the second network. For example and with reference to FIG. 4B, the network ID of network 410B ('98.765.43.21') can be processed to determine a location, such as a zip code (e.g., zip code '10055') associated with network 410B, such as in a manner known to those of ordinary skill in the art.

The device identifier is associated with the second location and the second time (330). For example and with reference to FIG. 4B, the device identifier of device 108 ('ABC123') can be associated with a second location (zip code '10055,' as determined at 325) and a time ('11:30 on 01/01/2012' and/or 09:00-17:00), such as in the manner shown in FIG. 2. It can be appreciated that, in doing so, the device identifier can be associated with a particular location (corresponding to the location of the network 410B to which the device was connected) and a particular time (corresponding to the time/timeframe during which the device was connected network 410B, and thus can be determined to be located at the second location, e.g., zip code 10055).

A content request is received from the device (335). It should be understood that, in certain implementations, such a content request can be received when the device is connected to a network that is not the first network and/or is neither the first network nor the second network. For example, such a network can include a cellular/mobile network (e.g., CDMA, GSM, etc.), as is known to those of ordinary skill in the art.

Moreover, it should be noted that, in certain implementations, the referenced content request can include a request for a third party content item, such as an advertisement. Moreover, in certain implementations, the referenced content items can include third party content items, such as advertisements, that are directed towards the first location.

Figure 4C:
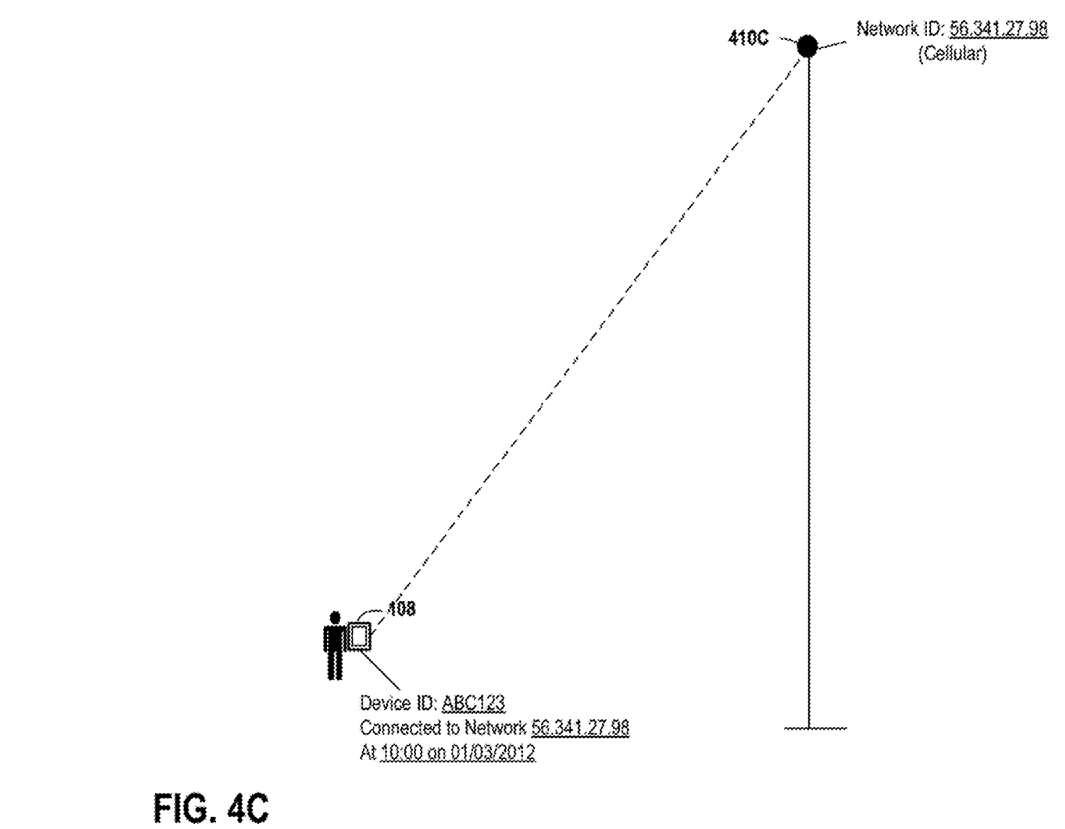
FIG. 4C depicts an exemplary scenario whereby a user device a network such as a cellular network.

By way of illustration, FIG. 4C depicts an exemplary scenario whereby user device 108 (such as the user device depicted in FIGS. 4A and 4B) is connected to a third network 410C, such as a cellular network. It can be appreciated that, in contrast to the network IDs of networks 410A and 410B (based upon which a location, such as a zip code, of a connected device can be determined, such as in the manner described at 310 and 325), the network ID of network 410C ('56.341.27.98,' as shown in FIG. 4C) corresponds to a carrier gateway of a cellular network to which device 108 is connected. Accordingly, unlike networks 410A and 410B, the location associated with the network ID of network 410C bears little or no relation to the actual geographical location of device 108. As such, rather than associating a content request originating at device 108 with the location to which the network ID of network 410C corresponds (which, as noted, does not correspond to the actual geographical location of device 108), such a content request from can be associated with the location of a network to which the device was previously connected (such as network 410A or 410B). For example, in certain implementations, the location (i.e., the location determined based on a network ID of a previously connected network) can be determined based on the correspondence between the time of the content request (e.g., 10:00 on 01/03/2012, as shown in FIG. 4C) and the time associated with the respective location(s), as described herein.

A determination is made that the device has been connected to the first network within a defined chronological proximity of receiving the content request (340). That is, it can be appreciated that while, under certain circumstances, it can be reasonable to extrapolate that a device is present at the same geographical location at a corresponding time/day (e.g., the same time of day/week) as the device has previously been conclusively determined to be present, based on a connection to a particular network (e.g., network 410A or 410B), such extrapolation becomes increasingly unreliable as the device remains unconnected to such a network for an extended period of time (reflecting that the device is less likely to be present regularly in such a geographical location). Accordingly, in order to extrapolate based on a time that a device is present at a particular location (such as a location at which the device was previously determined to be present at a corresponding earlier time, such as the same time/day of the week), a determination can be made that the device has been connected to the network based upon which such location was determined within a defined chronological proximity (e.g., two days, one week, etc.) of receiving the content request. If it cannot be determined that the device was connected to the network (based upon which the location was determined) within a defined chronological proximity of receiving the content request, it cannot be reasonably extrapolated that the device is located at the particular location. Similarly, in scenarios where it has been determined that the device has been connected to more that one network (e.g., networks 410A and 410B) at respective times, a determination can be made that the device has been connected to the first network and the second network within a defined chronological proximity of receiving the content request.

Moreover, in certain implementations, having determined that a device was not connected to one or more networks (such as a network at which a device is most often connected to and can thus be determined to be a 'home' network), and/or that the device was not connected to one or more networks that can be determined to be within a defined geographical proximity (e.g., a 25 mile radius) of such networks, within a defined chronological proximity of receiving a content request, it can be further determined that the device is away from its regular/usual location(s), and thus can be determined to be 'traveling.'

One or more content items are selected based on at least the first location (345). In certain implementations, such a selection can be performed based on a determination that the device has been connected to the first network within the defined chronological proximity of receiving the content request. It should be noted that, in certain implementations, the referenced content items are content items that are configured for presentation in relation to the first location. For example, as noted above, the referenced content items can include third party content item, such as advertisements. Moreover, in certain implementations, one or more content items can be selected based on a determination that (a) the device has been connected to the first network within the defined chronological proximity of receiving the content request, (b) the device has been connected to the second network within the defined chronological proximity of receiving the content request, and/or (c) the content request was received at a time that corresponds to at least one of the first time and the second time. In such implementations, the referenced content items can be selected in relation to a correspondence between the time and at least one of the first time and the second time. Additionally, such content items can be selected based on the first location and/or the second location, as determined based on the correspondence between the time (that is, the time that the device identifier is received, such as at 305) and the first time and/or the second time.

By way of illustration and with reference to FIG. 4C, having received a content request from device 108 at 10:00 on 01/03/12, and having determined that device 108 has been connected to both network 410A and 410B within a defined chronological proximity (e.g., 3 days) of the content request, a content item can be selected based on a correspondence between the time of the content request (i.e., 10:00) and the first time (i.e., the time during which the device was determined to be connected to network 410A, and thus associated with zip code 10001) or the second time (i.e., the time during which the device was determined to be connected to network 410B, and thus associated with zip code 10055). Accordingly, in a scenario where network 410A corresponds to a time (that is, a timeframe) of 18:00-08:00 (i.e., 6:00 pm-8:00 am), while network 410B corresponds to a time (that is, a timeframe) of 09:00-17:00 (i.e., 9:00 am-5:00 pm), it can be appreciated that a content request occurring at 10:00 (as shown in FIG. 4C) corresponds to the time associated with network 410B, which, in turn, is associated with zip code 10055, as noted above. Accordingly, it can be appreciated that a content item directed towards the location of network 410B (i.e., zip code 10055) can be selected, despite the fact that the content request originated from a carrier network, such as network 410C, which cannot be reliably relied upon to determine a location of a connected device, as described herein.

Moreover, in certain implementations the one or more content items can be selected based on a determination that a device was not connected to one or more networks (e.g., a 'home' network), and/or that the device was not connected to one or more networks determined to be within a defined geographical proximity (e.g., a 25 mile radius) of such networks, thus indicating that the device is traveling, such as determined in the manner described at 340. It can be appreciated that it can be advantageous for certain content providers, such as advertisers providing products or services that are appropriate for travelers, to provide content items, such as advertisements, that are directed towards such devices that can be determined to be traveling. Accordingly, with respect to devices that can be determined to be traveling (such as in the manner described herein), content items that are directed towards such devices (e.g., pertaining to travel-related services) can be selected.

Figure 5:
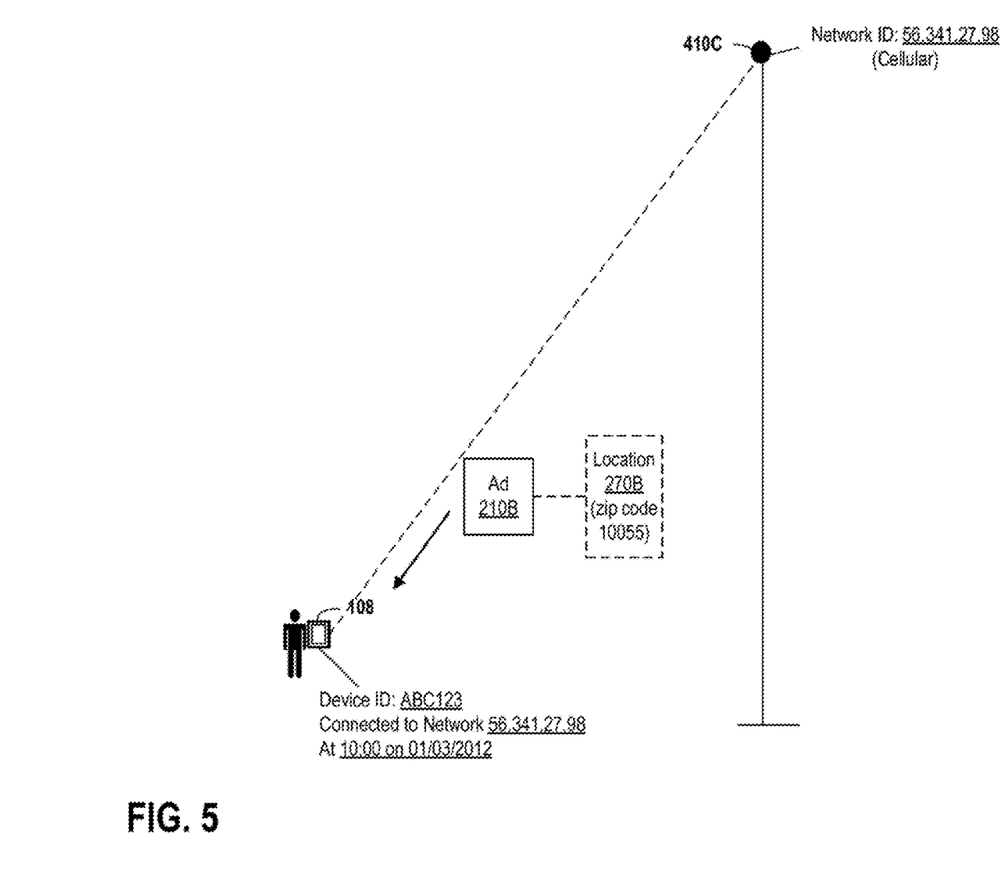
FIG. 5 depicts providing a content item to a user device based on a location of a network to which the user device was previously connected.

The one or more content items are provided to the device (350). For example, as shown in FIG. 5, having determined, such as at 345, that a content request occurring at 10:00 corresponds to the time associated with network 410B, which, in turn, is associated with zip code 10055, and selecting a content item (ad 210B) accordingly, the selected content item (ad 210B) can be provided to the device, despite the fact that the location of the device cannot be determined based on the network ID of network 410C to which the device is presently connected.

The device identifier can be disassociated from the first location (355). In certain implementations, the device identifier can be disassociated from the first location based on a determination that the device has not been connected to a network within a defined geographical proximity to the first network within a specified timeframe. That is, it can be appreciated that, as described at 340, an extrapolation that a device that was previously determined to be present at a particular location (by way of the network ID of the network to which the device was connected) becomes increasingly unreliable as the device remains unconnected to such a network for an extended period of time (reflecting that the device is less likely to be present regularly in such a geographical location). Accordingly, after a specified timeframe (e.g., five days, one week, etc.), an association between a device identifier and a location (such as that depicted in FIG. 2) can be disassociated if the device has not been determined to be connected to the same network, and/or a network within a defined geographical proximity (e.g. one mile, five miles, etc.) within a specified timeframe. It can be appreciated that, in doing so, only those locations that are reasonably likely to be current locations of the user device (by way of the user connecting to the corresponding networks within a reasonably close chronological proximity) can be used to determine a current location of the user, as described herein.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 6:
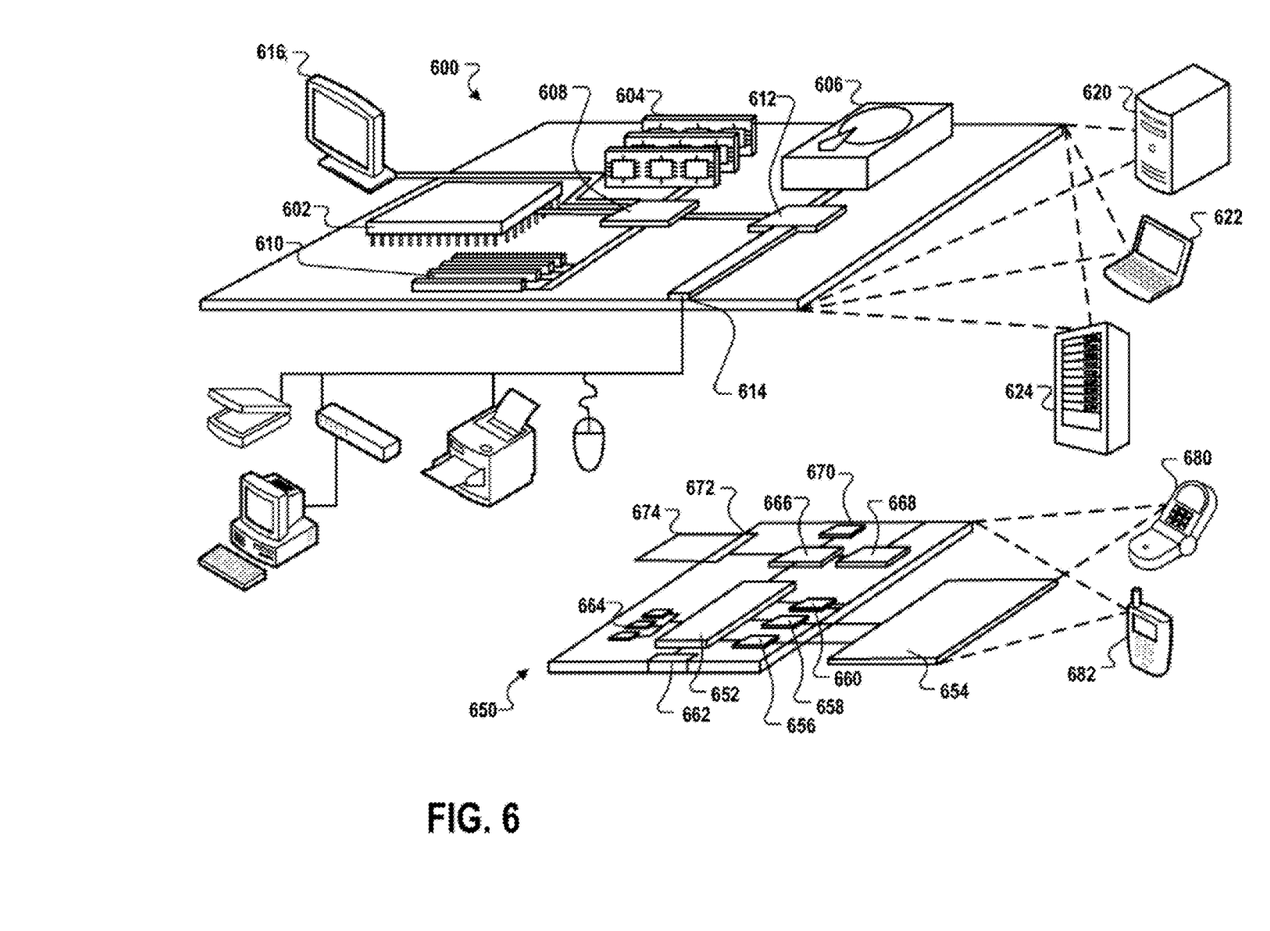
FIG. 6 shows an example of a computing device and a mobile computing device that can be used in connection with computer-implemented methods and systems described in the present specification.

FIG. 6 shows an example of a computing device 600 and a mobile computing device that can be used to implement the techniques described herein the present specification. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, e.g., a computer-readable storage medium such as a floppy disk device, a hard disk device, an optical disk device, or a tape device, a flash memory or other similar solid state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In the implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. In addition, it can be implemented in a personal computer such as a laptop computer 622. It can also be implemented as part of a rack server system 624. Alternatively, components from the computing device 600 can be combined with other components in a mobile device (not shown), such as a mobile computing device 650. Each of such devices can contain one or more of the computing device 600 and the mobile computing device 650, and an entire system can be made up of multiple computing devices communicating with each other.

The mobile computing device 650 includes a processor 652, a memory 664, an input/output device such as a display 654, a communication interface 666, and a transceiver 668, among other components. The mobile computing device 650 can also be provided with a storage device, such as a micro-drive or other device, to provide additional storage. Each of the processor 652, the memory 664, the display 654, the communication interface 666, and the transceiver 668, are interconnected using various buses, and several of the components can be mounted on a common motherboard or in other manners as appropriate.

The processor 652 can execute instructions within the mobile computing device 650, including instructions stored in the memory 664. The processor 652 can be implemented as a chipset of chips that include separate and multiple analog and digital processors. The processor 652 can provide, for example, for coordination of the other components of the mobile computing device 650, such as control of user interfaces, applications run by the mobile computing device 650, and wireless communication by the mobile computing device 650.

The processor 652 can communicate with a user through a control interface 658 and a display interface 656 coupled to the display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can provide communication with the processor 652, so as to enable near area communication of the mobile computing device 650 with other devices. The external interface 662 can provide, for example, for wired communication in some implementations, or for wireless communication in other implementations, and multiple interfaces can also be used.

The memory 664 stores information within the mobile computing device 650. The memory 664 can be implemented as one or more of a computer-readable medium or media, a volatile memory unit or units, or a non-volatile memory unit or units. An expansion memory 674 can also be provided and connected to the mobile computing device 650 through an expansion interface 672, which can include, for example, a SIMM (Single In Line Memory Module) card interface. The expansion memory 674 can provide extra storage space for the mobile computing device 650, or can also store applications or other information for the mobile computing device 650. Specifically, the expansion memory 674 can include instructions to carry out or supplement the processes described above, and can include secure information also. Thus, for example, the expansion memory 674 can be provide as a security module for the mobile computing device 650, and can be programmed with instructions that permit secure use of the mobile computing device 650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 can communicate wirelessly through the communication interface 666, which can include digital signal processing circuitry where necessary. The communication interface 666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 668 using a radio-frequency. In addition, short-range communication can occur, such as using a Bluetooth, WiFi, or other such transceiver (not shown). In addition, a GPS (Global Positioning System) receiver module 670 can provide additional navigation- and location-related wireless data to the mobile computing device 650, which can be used as appropriate by applications running on the mobile computing device 650.

The mobile computing device 650 can also communicate audibly using an audio codec 660, which can receive spoken information from a user and convert it to usable digital information. The audio codec 660 can likewise generate audible sound for a user, such as through a speaker, e.g., in a handset of the mobile computing device 650. Such sound can include sound from voice telephone calls, can include recorded sound (e.g., voice messages, music files, etc.) and can also include sound generated by applications operating on the mobile computing device 650.

The mobile computing device 650 can be implemented in a number of different forms, as shown in the figure. For example, it can be implemented as a cellular telephone 680. It can also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method of providing third party content at a mobile computing device, the method comprising:

receiving, at a first time, a device identifier of the mobile computing device in association with a first Internet protocol (IP) address, the first IP address corresponding to a first network to which the mobile computing device is connected;

determining a first location of the mobile computing device based on the first IP address, the first location associated with the first network;

associating the device identifier with the first location and the first time;

receiving a content request from the mobile computing device at a second time when the mobile computing device is connected to a second network that is different from the first network;

determining, based on associating the device identifier with the first location and the first time, that the mobile computing device has been connected to the first network within a defined chronological proximity from when the device was connected to the first network to when the content request was received;

associating the content request received from the mobile computing device with the first location at the second time based on a determination that the mobile computing device has been connected to the first network within the defined chronological proximity of receiving the content request;

based on the associating of the content request with the first location at the second time, selecting one or more content items based on at least the first location; and providing the one or more content items to the mobile computing device.

2. The method of claim 1, wherein the first time comprises a first timeframe.

3. The method of claim 1, wherein the device identifier comprises a hashed device identifier.

4. The method of claim 1, wherein the content request comprises a request for a third party content item.

5. The method of claim 1, wherein the selecting one or more content items further comprises selecting one or more content items that are configured for presentation in relation to the first location.

6. The method of claim 1, wherein the one or more content items comprise one or more third party content items associated with products or services pertaining to the first location.

7. The method of claim 1, wherein the first network comprises a wifi network and the second network is a cellular network.

8. The method of claim 1, wherein the first location comprises a zip code.

9. The method of claim 1, further comprising: based on a determination that the mobile computing device has not been connected to a network within the defined geographical proximity to the first network within a specified timeframe, disassociating the device identifier from the first location.

10. The method of claim 1, further comprising:

receiving, at a third time, the device identifier in association with a second IP address, the second IP address corresponding to a third network to which the computing mobile device is connected, the third network different from the first and second networks;

determining a second location of the mobile computing device based on the second IP address, the second location associated with the third network; and associating the device identifier with the second location and the third time;

wherein the content request is received from the mobile computing device when the mobile computing device is not connected to the first network nor the third network;

wherein determining that the mobile computing device has been connected to the first network within the defined chronological proximity includes determining that the mobile computing device has been connected to the third network within the defined proximity from when the mobile computing device was connected to the third network to when the content request was received; and selecting one or more content items based on at least the first location comprises: based on the content request being received at a time that corresponds to at least one of the first time and the third time, selecting, in relation to a correspondence between the time and at least one of the first time and the third time, one or more content items based on at least one of the first location and the second location.

11. The method of claim 1 further comprising upon determining that the mobile computing device was not connected to the first network within the defined chronological proximity of receiving the content request, selecting one or more content items based on a traveling state of the mobile computing device.

12. A system comprising: one or more processors configured to interact with a non-transitory computer-readable medium in order to perform operations comprising:

receiving, at a first time, a device identifier of the mobile computing device in association with a first Internet protocol (IP), the first IP address corresponding to a first network to which the mobile computing device is connected;

determining a first location of the mobile computing device based on the first IP address, the first location associated with the first network;

associating the device identifier with the first location and the first time;

receiving a content request from the mobile computing device at a second time when the mobile computing device is connected to a second network that is different from the first network;

determining, based on associating the device identifier with the first location and the first time, that the mobile computing device has been connected to the first location within a defined chronological proximity from when the mobile computing device was connected to the first network to when the content request was received;

associating the content request received from the mobile computing device with the first location at the second time based on a determination that the mobile computing device has been connected to the first network within the defined chronological proximity of receiving the content request;

based on the associating of the content request with the first location at the second time, selecting one or more content items based on at least the first location; and providing the one or more content items to the mobile computing device.

13. The system of claim 12, wherein the first time comprises a first timeframe.

14. The system of claim 12, wherein the device identifier comprises a hashed device identifier.

15. The system of claim 12, wherein the content request comprises a request for a third party content item.

16. The system of claim 12, wherein the selecting one or more content items further comprises selecting one or more content items that are configured for presentation in relation to the first location.

17. The system of claim 12, wherein the one or more content items comprise one or more third party content items associated with products or services pertaining to the first location.

18. The system of claim 12, wherein the first network comprises a wifi network and the second network comprises a cellular network.

19. The system of claim 12, wherein the first location comprises a zip code.

20. The system of claim 12, further configured to perform operations comprising: based on a determination that the device has not been connected to a network within a defined geographical proximity to the first network within a specified timeframe, disassociating the device identifier from the first location.

21. The system of claim 12, further configure to perform operations comprising:

receiving, at a third time, the device identifier in association with a second IP address, the second IP address corresponding to a third network to which the mobile computing device is connected, the third network different from the first and second networks;

determining a third location of the mobile computing device based on the second IP address; and associating the device identifier with the second location and the third time;

wherein the content request is received from the mobile computing device when the mobile computing device is not connected to the first network nor the third network;

wherein determining that the mobile computing device has been connected to the first network within the defined chronological proximity includes determining that the mobile computing device has been connected to the third network within the defined proximity from when the mobile computing device was connected to the third network to when the content request was received; and selecting one or more content items based on at least the first location comprises: based on the content request being received at a time that corresponds to at least one of the first time and the third time, selecting, in relation to a correspondence between the time and at least one of the first time and the third time, one or more content items based on at least one of the first location and the second location.

22. The system of claim 12, wherein the one or more processors are further configured to, upon determining that the mobile computing device was not connected to the first network within a defined chronological proximity of receiving the content request, selecting one or more content items based on a traveling state of the mobile computing device.

* * * * *